United States Patent
Satish et al.

(10) Patent No.: US 8,645,923 B1
(45) Date of Patent: Feb. 4, 2014

(54) ENFORCING EXPECTED CONTROL FLOW IN PROGRAM EXECUTION

(75) Inventors: Sourabh Satish, Fremont, CA (US); Bruce McCorkendale, Manhattan Beach, CA (US); William E. Sobel, Jamul, CA (US)

(73) Assignee: Symantec Corporation, Mountain View, CA (US)

( * ) Notice: Subject to any disclaimer, the term of this patent is extended or adjusted under 35 U.S.C. 154(b) by 1070 days.

(21) Appl. No.: 12/263,362

(22) Filed: Oct. 31, 2008

(51) Int. Cl.
*G06F 9/45* (2006.01)

(52) U.S. Cl.
USPC .......................... 717/131; 717/132; 717/155

(58) Field of Classification Search
None
See application file for complete search history.

(56) References Cited

U.S. PATENT DOCUMENTS

| | | | |
|---|---|---|---|
| 6,993,751 B2 * | 1/2006 | Bhansali et al. | 717/137 |
| 7,155,708 B2 * | 12/2006 | Hammes et al. | 717/155 |
| 7,287,166 B1 * | 10/2007 | Chang et al. | 713/187 |
| 7,299,458 B2 * | 11/2007 | Hammes | 717/132 |
| 7,337,291 B2 * | 2/2008 | Abadi et al. | 711/163 |
| 7,577,992 B2 * | 8/2009 | Abadi et al. | 726/22 |
| 7,721,275 B2 * | 5/2010 | Kestner et al. | 717/155 |
| 7,752,609 B2 * | 7/2010 | Rioux | 717/155 |
| 7,757,223 B2 * | 7/2010 | Cabillic et al. | 717/155 |
| 7,765,579 B2 * | 7/2010 | Wallace | 726/1 |
| 7,886,276 B2 * | 2/2011 | Tai et al. | 717/132 |
| 7,900,193 B1 * | 3/2011 | Kolawa et al. | 717/131 |
| 7,926,037 B2 * | 4/2011 | Leino et al. | 717/131 |
| 7,971,255 B1 * | 6/2011 | Kc et al. | 726/24 |
| 8,060,848 B2 * | 11/2011 | Matsuda et al. | 717/132 |
| 8,099,697 B2 * | 1/2012 | Matsuda et al. | 717/131 |
| 2004/0088689 A1 * | 5/2004 | Hammes | 717/154 |
| 2006/0015858 A1 * | 1/2006 | Tanimoto et al. | 717/140 |
| 2007/0050848 A1 * | 3/2007 | Khalid | 726/24 |
| 2007/0083274 A1 * | 4/2007 | Krauss | 700/4 |
| 2007/0283113 A1 * | 12/2007 | Grunkemeyer et al. | 711/163 |
| 2008/0148399 A1 * | 6/2008 | Winkler | 726/22 |
| 2009/0222923 A1 * | 9/2009 | Dixon | 726/24 |
| 2010/0275186 A1 * | 10/2010 | McGarvey et al. | 717/131 |
| 2011/0219361 A1 * | 9/2011 | Dolby et al. | 717/136 |
| 2012/0278792 A1 * | 11/2012 | Kuperstein et al. | 717/131 |
| 2013/0055220 A1 * | 2/2013 | Murthy | 717/132 |
| 2013/0055221 A1 * | 2/2013 | Murthy et al. | 717/132 |

OTHER PUBLICATIONS

Zhenqian Chen and Baowen Xu, "Slicing Concurrent Java Program", 2001, ACM SIGPLAN Notices; [retrieved on Dec. 21, 2011]; Retrieved from Internet <URL:http://dl.acm.org/citation.cfg?id=375420>; pp. 41-47.*

(Continued)

*Primary Examiner* — Thuy Dao
*Assistant Examiner* — Xi D Chen
(74) *Attorney, Agent, or Firm* — Brill Law Office; Jeffrey Brill

(57) ABSTRACT

When a program is loaded for execution, all code pages of the program except the one containing the entry point are set to be non-executable. When the executing program attempts to jump between code pages, an exception is thrown. Responsive to such an exception, a control flow graph of the program is examined, to determine if the attempted jump between code pages is expected. If the attempted jump is not expected, it is determined that the program is attempting a malicious activity. If the attempted jump is expected, the code page to which the program is attempting to jump is set to be executable, and control is returned to the program such that the jump executes.

32 Claims, 2 Drawing Sheets

(56) References Cited

OTHER PUBLICATIONS

Mohapatra, et al., "An Efficient Technique for Dynamic Slicing of Concurrent Java Programs", 2004, Springer 2004; [retrieved on Dec. 21, 2011]; Retrieved from Internet <URL:http://springerlink.com/content/acyqc5rhd9dr0ejk/fulltext.pdf>; pp. 255-262.*

Schacham, "The Geometry of Innocent Flesh on the Bone: Return-into-libc without Function Calls (on the x86)", ACM 2007; [retrieved on Dec. 19, 2011]; Retrieved from Internet <URL:http://dl.acm.org/citation.cfg?id=1315313>; pp. 552-561.*

Ping Chen, et al., "DROP: Detecting Return-Oriented Programming Malicious Code", Springer 2009; [retrieved on Dec. 19, 2011]; Retrieved from Internet <URL:http://www.springerlink.com/content/c6674628p9n27I03/fulltext.pdf>;pp. 163-177.*

Ulfar Erlingsson, "Low-level Software Security:Attacks and Defenses", Microsoft Research Report, Nov. 2007; [retrieved on Dec. 19, 2011]; Retrieved from Internet <URL:ftp://ftp.research.microsoft.com/pub/tr/TR-2007-153.pdf>; pp. 1-43.*

Ziener, "Concepts for Autonomous Control Flow Checking for Embedded CPUs", Springer, 2008: [retrieved on Dec. 20, 2011]; Retrieved from Internet <URL:http://www.springerlink.com/content/g18p323k5h453145/fulltext.pdf>; pp. 235-248.*

Goloubeva, et al., "Soft-error Detection Using Control Flow Assertions", 2003 IEEE; [retrieved on Jun. 27, 2013]; Retrieved from Intrnet <URL:http://www.cad.polito.it/db/dft2003c.pdf>;pp. 1-8.*

Kayaalp, et al., "Efficiently Securing Systems from Code Resue Attacks"; 2012 IEEE; [retrieved on Sep. 26, 2013]; Retrieved fromm Internet <URL:http://ieeexplore.ieee.org/stamp/stamp.jsp?tp=&arnumber=6355533>;pp. 1-14.*

Liu, Tan "Automated Insertion of Exceptin Handling for Key and Referential Constraints"; 2012 IEEE; [retrieved on Sep. 26, 2013]; Retrieved fromm Internet <URL:http://ieeexplore.ieee.org/stamp/stamp.jsp?tp=&arnumber=6462754>;pp. 848-856.*

Zeng, et al., "Combining Control-Flow Integrity and Static Analysis for Efficient and Validated Data Sandboxing"; 2011 AMC; [retrieved on Sep. 26, 2013]; Retrieved fromm Internet <URL:http://dl.acm.org/citation.cfm?id=2046707>;pp. 29-39.*

Zhang, et al., "Anomalous Path Detection with Hardware Support"; 2005 AMC; [retrieved on Sep. 26, 2013]; Retrieved fromm Internet <URL:http://dl.acm.org/citation.cfm?id=1086297>pp. 43-54.*

* cited by examiner

ENFORCING EXPECTED CONTROL FLOW IN PROGRAM EXECUTION

TECHNICAL FIELD

This invention pertains generally to computer security, and more specifically to enforcing expected control flow in program execution.

BACKGROUND

A shellcode is a small piece of code that takes advantage of a software vulnerability to attack a computer. Many shellcodes work by exploiting stack or buffer overflows. Various known techniques can be used to protect against shellcodes exploiting overflows, such as utilizing bounds checking to detect overflows in programs. Current versions of Microsoft Windows® include a security feature called Data Execution Prevention (DEP), which prevents execution of code from non-executable regions (e.g., the stack, the heap), thereby protecting against the exploitation of buffer overflows.

A new type of advanced shellcode, referred to as a "return oriented shellcode," exploits vulnerabilities in programs not by executing from the stack or heap, but by jumping between locations within the executable image itself. Because a return oriented shellcode runs from executable regions, it completely bypasses protection mechanisms such as DEP that detect buffer overflow exploits.

A control flow graph (CFG) is a graphical representation of all possible execution paths for a program. Each node in the graph represents a piece of code with one or more jump targets, and one or more jumps. Directed edges are used to represent jumps in the control flow. The entry point is represented by a single entry block, through which control flow enters into the graph. The exit block represents the code through which all control flow exits the program.

CFG based enforcement technologies exist, which rely on tracing control transfer instructions. These approaches are useful in certain contexts. However, return oriented shellcodes can bypass execution of control transfer instructions and/or API entry and exit points. In such cases, current CFG based security agents are not able to detect or protect against return oriented shellcodes.

It would be desirable to be able to address these security vulnerabilities.

SUMMARY

When a program is loaded for execution, all code pages of the program except the one containing the entry point are set to be non-executable. This way, when the executing program attempts to jump between code pages, an exception is thrown. In response to an exception resulting from an attempted jump between code pages, a control flow graph of the program is examined, to determine if the attempted jump between code pages is expected, as per the control flow graph and the pages corresponding to them. If the attempted jump is not expected, it is determined that the program is attempting malicious activity, and appropriate action is taken. Such action can include steps such as not permitting the attempted jump to execute, transmitting an alert to a central security service, transmitting an alert to a user, activating anti-malware software, terminating the program and/or modifying the program. On the other hand, if the attempted jump between code pages is expected, it is determined that the program is not attempting a malicious action, and the jump is allowed to execute. More specifically, the code page to which the program is attempting to jump can be set to be executable, and control can be returned to the program such that the jump executes.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
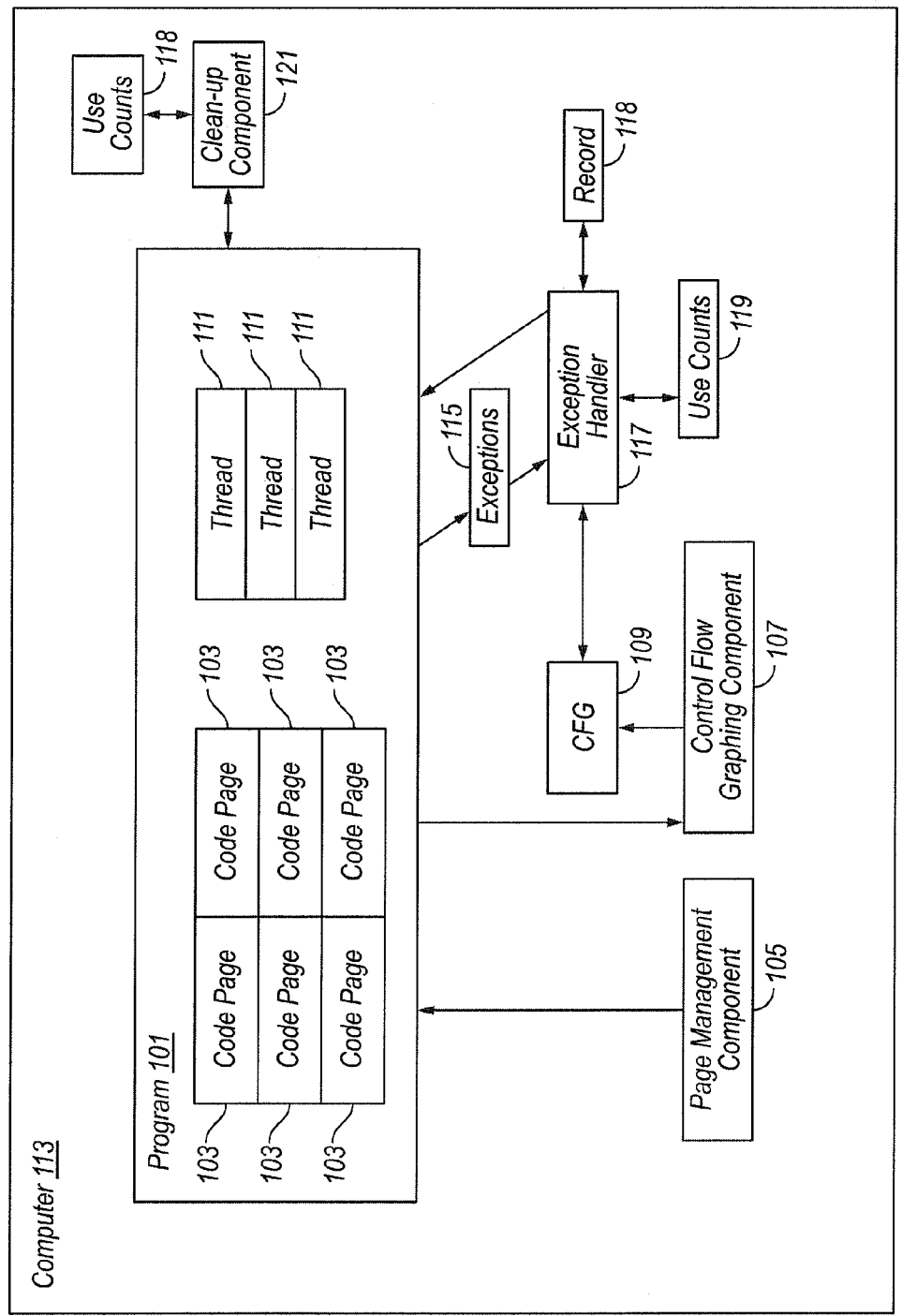
FIG. 1 is a block diagram illustrating a system for enforcing expected control flow in program execution, according to some embodiments of the present invention.

FIG. 1 illustrates a system for enforcing expected control flow in program 101 execution, according to some embodiments of the present invention. It is to be understood that although various components are illustrated and described above as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As illustrated in FIG. 1, a program 101 comprises a plurality of code pages 103, each of which can be set to be executable or non-executable. Under standard operation outside of the context of the present invention, when a program 101 is loaded for execution, each code page 103 is set to be executable. For example, under Microsoft Windows®, when the loader loads a file comprising an executable image (e.g., a .exe file) into memory, it sets a specific attribute bit for each code page 103 to indicate that the code page 103 is executable. In contrast, according to embodiments of the present invention, a page management component 105 explicitly sets all code pages 103 of the program 101 other than the page 103 containing entry point as non-executable. The exact implementation mechanics for setting code pages 103 of a program 101 to be non-executable can vary between operating systems and hardware platforms. Typically, the value of a specific bit determines whether a given code page 103 is executable or not. Note that in some embodiments, the page management component 105 sets the code pages 103 to be non-executable when the program 101 is loaded. In other embodiments, this function can be performed after loading but prior to execution as desired.

A graphing component 107 builds a CFG 109 for the program 101. In the scenario of a program 101 comprising a single thread 111 of execution, a single CFG 109 that maps the execution flow of that thread 111 is created. Contemporary programs 101 tend to be multi-threaded, and in these cases the graphing component 107 constructs CFG 109 structure to track the execution flow of the multiple threads 111 of the program 101. For example, a CFG 109 can represent the possible control flow for the multi-threaded program 101 as a whole. Each thread 111 can be associated with each node of the CFG 109 in which that thread could be expected to execute according to the legal control flow, with directed edges capturing the control flow on a per thread 111 basis. Individual threads 111 can be uniquely identified, for example under Windows by their Win32StartAddresses. Thus, a CFG 109 representing the flow control of the program 101 on a per thread 111 basis can be created. Note that the this "master" CFG 109 can be thought of as a union of the set of CFGs 109 for each of the individual threads 111 of the program 101.

The CFG 109 utilized according to various embodiments of the present invention typically represents code pages 103 rather than functional nodes, as more than one functional node could be in the same page 103. In other words, the 109 is built such that each node therein comprises a single code page 103 of the program 101, rather than a block of functionality. The CFG 109 can be built in a test environment, or directly on a computer 113 which is being monitored for threats (the endpoint). Building the CFG 109 on the endpoint 113 accommodates subtle differences between program execution environments, which are difficult to account for when generating CFGs 109 in a clean, isolated, test environment.

Because all of the code pages 103 other than the one containing the entry point are initially set to be non-executable, whenever the flow of control jumps from one code page 103 to another, an exception 115 is thrown. In response to these exceptions 115, the exception handler 117 refers to the CFG 109 to determine if the jump is part of the legal flow of control for the program. If not, the exception handler 117 determines that the program 101 is attempting to perform a malicious action (e.g., because it has been corrupted by a return oriented shellcode) and takes appropriate action. What specific action to take in response to determining that the program 101 is attempting to perform a malicious action is a variable design parameter. Typically, under such circumstances, the exception handler 117 does not allow the unexpected jump to execute. Options for additional steps to take include but are not limited to terminating the program 101, modifying the program 101, generating an alert message to a user, sending a message to a central security server, activating an anti-malware application, etc.

Where the attempted jump is expected according to the CFG 109, the exception handler 117 determines that the program 101 is not attempting to perform a malicious action. Under these circumstances, the exception handler 117 sets the target code page 103 to be executable, and returns control to the program 101. The jump then executes successfully, and the control flow of the program 101 proceeds as expected. The code page 103 from which the control flow jumped is to be set back to non-executable, and this can be done in one of various ways as described in detail below.

In the case of a multi-threaded program 101, rather than simply setting the target code page 103 to be executable, the exception handler 117 accounts for the threads 111 other than the one that is attempting to execute the jump that threw the exception. Because there are multiple threads 111 of execution, one or more other threads 111 could already be executing code in the target code page 103 as a result of another jump that has already executed, and thus the target code page 103 could already be set to executable.

To account for multiple threads 111, the exception handler 117 can maintain use counts 119 indicating the number of active threads 111 in given code pages 103. (A use count 119 can be in the form of, e.g., a variable.) More specifically, when the exception handler 117 detects that a first thread 111 is attempting to execute a permitted jump to a given code page 103 in which no other threads 111 are currently executing, the exception handler 117 sets the target code page 103 to be executable as described above, and sets a use count 119 for that code page 103 to indicate that a single thread 111 is executing code in that page 103 (e.g., sets the value of the use count to 1). If a second thread 111 attempts an authorized jump to the same target code page 103 while the first thread is executing therein, the exception handler 117 increments the use count 119 to indicate that two threads are executing code 103 in that page 103. Because the code page 103 is already set to executable, the exception handler 117 does not change the executable setting.

The above description is of the exception handler 117 processing the executable settings and/or use counts 119 of code pages 103 to which control flow jumps. When the exception handler 117 is triggered in response to an attempted jump, the exception handler 117 can also process the executable setting and/or use count 119 of code pages 103 from which control jumps. In the case of a program 101 with a single thread 111 of execution, the exception handler 117 can simply set code pages 103 from which the program 101 has jumped to be non-executable. Note that if the exception handler 117 set the code page 103 from which control is currently attempting to jump to be non-executable, the jump would not be able to execute when control is returned to the program 101, because the jump instruction is in that code page 103. For this reason, the exception handler 117 can store a record 118 indicating the code page 103 from which control is jumping, before returning control to the program 101. The next time the exception handler processes a jump attempt, it reads the record 118 and sets the indicated code page 103 to be non-executable.

In the case of multi-threaded programs 101, when a thread 111 jumps from a code page 103, the exception handler 117 can decrement the use count 119 for that code page 103, indicating that one fewer thread 111 is active therein. If the exit of the thread 111 from the code page 103 brings the number of threads 111 executing in that code page 103 to zero (e.g., if use count equals 0 after the decrement caused by the jump), the exception handler 117 also stores a record 118 of the code page 103, and upon the next processing of a jump attempt sets the indicated code page 103 to be non-executable. In another embodiment, rather than the exception handler 117 performing the above-described processing concerning code pages 103 from which control flow has jumped, a dedicated clean-up component 121 monitors the various ones of the code pages 103, updates the corresponding usage counts 119 as threads 111 jump therefrom, and sets code pages 103 in which no threads 111 are executing back to non-executable.

To keep the CFG 109 representing the control flow of a program 101 on a per thread 111 basis current, the CFG 109 is updated when a thread 111 terminates. The termination of a thread 111 (either expectedly or unexpectedly) throws an exception 115. Responsive to such an exception 115, the exception handler 117 updates the CFG 109 to indicate that the terminated thread 111 is no longer executing. Thinking of the CFG 109 as a union of the set of CFGs 109 for each of the individual threads 111 of the program 101, the terminated thread 111 is removed from the set, thereby updating the union.

Figure 2:
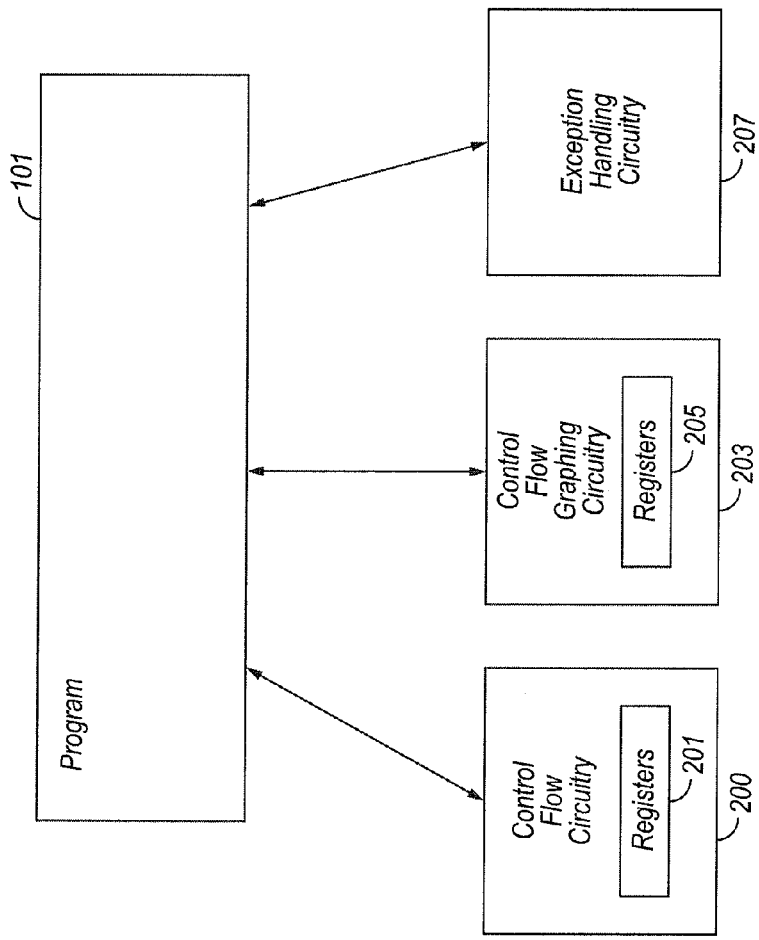
FIG. 2 is a block diagram illustrating an embodiment of the present invention instantiated in hardware.

FIG. 2 illustrates a hardware based embodiment of the present invention. As noted above, some or all of the functionality for enforcing expected control flow in program 101 execution can be implemented in hardware. As with any processing functionality, a hardware based implementation executes considerably faster than a software based one, all other factors being equal. As illustrated in FIG. 2, hardware implemented control flow circuitry 200 uses specific registers 201 to track the executable status and use count 119 of each code page 103 of the program 101 at a thread 111 level. Hardware implemented control flow graphing circuitry 203 creates the CFG 109 for the program 101 to be monitored, and utilizes CFG registers 205 to store the CFG 109 data on a per thread 111 basis. The relevant exception 115 handling is performed by hardware based exception handling circuitry 207.

It is to be understood that in some embodiments some or all of the above described hardware implemented functionality is instantiated on one or more dedicated integrated circuits, whereas in other embodiments some or all of the hardware implemented functionality is included in and/or supported by one or more third party integrated circuits which also include additional, general purpose functionality. In some embodiments, more or less of the functionality for enforcing expected control flow in program 101 execution can be implemented in hardware, as desired.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats. Furthermore, the portions, modules, agents, managers, components, functions, procedures, actions, layers, features, attributes, methodologies and other aspects of the invention can be implemented as software, hardware, firmware or any combination of the three. Wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any computing device. Accordingly, the disclosure of the present invention is intended to be illustrative, but not limiting, of the scope of the invention, which is set forth in the following claims.

What is claimed is:

1. A computer implemented method for enforcing control flow in an execution of a program, the method comprising the steps of:
   preventing, by a computer, jumps between code pages in the execution of a program until verified against a control flow graph by setting all code pages of the program except a code page containing an entry point to be non-executable;
   causing, by a computer, an exception handler to process an exception responsive to each attempted jump between code pages, and prior to execution of a destination code page;
   responsive to an exception resulting from an attempted jump between code pages in the execution of the program, processing, by a computer, the exception by referring to the control flow graph concerning the program to determine whether the attempted jump between code pages is expected according to the control flow graph; and
   responsive to at least whether the attempted jump between code pages is expected according to the control flow graph, determining, by a computer, whether the program is attempting a malicious action.

2. The method of claim 1 further comprising performing a at least one step from a group of steps consisting of:
   receiving a control flow graph concerning the program;
   building a control flow graph concerning the program;
   building a control flow graph concerning the program, such that said control flow graph represents flow of control of the execution of a multi-threaded program on a per thread basis; and
   building a control flow graph concerning the program, such that each node of said control flow graph comprises a code page of the program.

3. The method of claim 1 further comprising:
   determining that the attempted jump between code pages is not expected according to the control flow graph;
   responsive to determining that the attempted jump between code pages is not expected, determining that the program is attempting a malicious action; and
   responsive to determining that the program is attempting a malicious action, performing at least one additional step from a group of steps consisting of:
     not permitting the attempted jump to execute;
     transmitting an alert to a central security service;
     transmitting an alert to a user;
     activating an anti-malware application;
     terminating the program; and
     modifying the program.

4. The method of claim 1 further comprising:
   determining that the attempted jump between code pages is expected according to the control flow graph;
   responsive to determining that the attempted jump between code pages is expected according to the control flow graph, determining that the program is not attempting a malicious action; and
   responsive to determining that the program is not attempting a malicious action, allowing the jump to execute.

5. The method of claim 4 wherein allowing the jump to execute further comprises:
   setting the code page to which the program is attempting to jump to be executable; and
   returning control to the program such that the attempted jump executes.

6. The method of claim 4 wherein allowing the jump to execute further comprises:
modifying a use count associated with the code page to which the program is attempting to jump to indicate that a thread not currently executing in that code page is to execute therein; and
returning control to the program such that the attempted jump executes.

7. The method of claim 6 further comprising:
responsive to the use count associated with the code page to which the program is attempting to jump indicating that no threads are currently executing in that code page, setting that code page to be executable.

8. The method of claim 4 wherein allowing the jump to execute further comprises:
subsequently setting the code page from which the program is attempting to jump to be non-executable.

9. The method of claim 4 wherein allowing the jump to execute further comprises:
modifying a use count associated with the code page from which the program is attempting to jump to indicate that a thread currently executing in that code page is to cease executing therein.

10. The method of claim 9 further comprising:
responsive to the modified use count associated with the code page from which the program is attempting to jump indicating that no threads are currently executing in that code page, subsequently setting that code page to be non-executable.

11. The method of claim 1 further comprising:
monitoring code pages; and
setting at least one executable code page in which no thread is executing to be non-executable.

12. The method of claim 1 further comprising:
monitoring code pages; and
for at least one code page, modifying a use count associated with that code page to indicate that at least one thread has ceased executing in that code page.

13. The method of claim 12 further comprising:
responsive to a modified use count indicating that no threads are currently executing in the associated code page, setting that code page to be non-executable.

14. The method of claim 1 further comprising:
determining that at least one thread of the program has terminated; and
responsive to determining that the at least one thread has terminated, updating the control flow graph concerning the program to account for the termination of the at least one thread.

15. A system for enforcing control flow in an execution of a program, the system comprising:
hardware implemented control flow circuitry configured to prevent jumps between code pages in the execution of a program until verified against a control flow graph by setting all code pages of the program except a code page containing an entry point to be non-executable and cause an exception handler to process an exception responsive to each attempted jump between code pages, and prior to execution of a destination code page;
a set of hardware implemented registers configured to track an executable status of each code page of the program; and
hardware implemented exception handling circuitry, configured to process the exception by referring to a control flow graph concerning the program responsive to an exception resulting from an attempted jump between code pages in the execution of the program and to determine whether the attempted jump between code pages is expected according to the control flow graph;
wherein the exception handling circuitry is further configured, in response to determining that the attempted jump between code pages is not expected, to perform at least one additional step from a group of steps consisting of: not permitting the attempted jump to execute, transmitting an alert to a central security service, transmitting an alert to a user, activating an anti-malware application, terminating the program, and modifying the program; and
wherein the exception handling circuitry is further configured, in response to determining that the attempted jump between code pages is expected, to allow the jump to execute by setting the code page to which the program is attempting to jump to be executable and returning control to the program such that the attempted jump executes.

16. The system of claim 15 further comprising:
hardware implemented control flow graphing circuitry, configured to build a control flow graph concerning the program.

17. The system of claim 16 further comprising:
at least one hardware implemented control flow graph register configured to store control flow graph data concerning the program.

18. The system of claim 16 wherein the control flow graphing circuitry is further configured to:
build the control flow graph concerning the program such that said control flow graph represents flow of control of the execution of a multi-threaded program on a per thread basis.

19. The system of claim 15 wherein the exception handling circuitry is further configured to execute at least one of the following steps as part of allowing the jump to execute:
modifying a use count associated with the code page to which the program is attempting to jump to indicate that a thread not currently executing in that code page is to execute therein; and
responsive to the use count associated with the code page to which the program is attempting to jump indicating that no threads are currently executing in that code page, setting that code page to be executable.

20. The system of claim 15 wherein the exception handling circuitry is further configured to execute at least one of the following steps as part of allowing the jump to execute:
subsequently setting the code page from which the program is attempting to jump to be non-executable;
modifying a use count associated with the code page from which the program is attempting to jump to indicate that a thread currently executing in that code page is to cease executing therein; and
responsive to the modified use count associated with the code page from which the program is attempting to jump indicating that no threads are currently executing in that code page, subsequently setting that code page to be non-executable.

21. The system of claim 15 further comprising hardware implemented code page monitoring circuitry configured to execute at least one of the following steps:
monitoring code pages;
setting at least one executable code page in which no thread is executing to be non-executable;
for at least one code page, modifying a use count associated with that code page to indicate that at least one thread has ceased executing in that code page; and responsive to a modified use count indicating that no threads are currently executing in the associated code page, setting that code page to be non-executable.

22. The system of claim 15 wherein the exception handling circuitry is further configured to:
   determine that at least one thread of the program has terminated, and responsive to determining that the at least one thread has terminated, to update the control flow graph concerning the program to account for the termination of the at least one thread.

23. At least one non-transitory computer readable medium storing a computer program product for enforcing control flow in an execution of a program, the computer program product comprising:
   program code for preventing jumps between code pages in the execution of a program until verified against a control flow graph by setting all code pages of the program except a code page containing an entry point to be non-executable;
   program code for causing, an exception handler to process an exception responsive to each attempted jump between code pages, and prior to execution of a destination code page;
   program code for, responsive to an exception resulting from an attempted jump between code pages in the execution of the program, processing the exception by referring to the control flow graph concerning the program to determine whether the attempted jump between code pages is expected according to the control flow graph;
   program code for, responsive to determining that the attempted jump between code pages is not expected, determining that the program is attempting a malicious action; and
   program code for, responsive to determining that the attempted jump between code pages is expected, determining that the program is not attempting a malicious action and allowing the jump to execute.

24. The computer program product of claim 23 further comprising program code for performing at least one step from a group of steps consisting of:
   receiving a control flow graph concerning the program;
   building a control flow graph concerning the program;
   building a control flow graph concerning the program, such that said control flow graph represents flow of control of the execution of a multi-threaded program on a per thread basis; and
   building a control flow graph concerning the program, such that each node of said control flow graph comprises a code page of the program.

25. The computer program product of claim 23 further comprising program code for, responsive to determining that the program is attempting a malicious action, performing at least one additional step from a group of steps consisting of:
   not permitting the attempted jump to execute;
   transmitting an alert to a central security service;
   transmitting an alert to a user;
   activating an anti-malware application;
   terminating the program; and
   modifying the program.

26. The computer program product of claim 23 wherein the program code for allowing the jump to execute further comprises:
   program code for setting the code page to which the program is attempting to jump to be executable; and
   program code for returning control to the program such that the attempted jump executes.

27. The computer program product of claim 23 further comprising:
   program code for modifying a use count associated with the code page to which the program is attempting to jump to indicate that a thread not currently executing in that code page is to execute therein;
   program code for, responsive to the use count associated with the code page to which the program is attempting to jump indicating that no threads are currently executing in that code page, setting that code page to be executable; and
   program code for returning control to the program such that the attempted jump executes.

28. The computer program product of claim 23 wherein the program code for allowing the jump to execute further comprises:
   program code for subsequently setting the code page from which the program is attempting to jump to be non-executable.

29. The computer program product of claim 23 further comprising:
   program code for modifying a use count associated with the code page from which the program is attempting to jump to indicate that a thread currently executing in that code page is to cease executing therein; and
   program code for, responsive to the modified use count associated with the code page from which the program is attempting to jump indicating that no threads are currently executing in that code page, subsequently setting that code page to be non-executable.

30. The computer program product of claim 23 further comprising:
   program code for monitoring code pages; and
   program code for setting at least one executable code page in which no thread is executing to be non-executable.

31. The computer program product of claim 23 further comprising:
   program code for monitoring code pages;
   program code for, for at least one code page, modifying a use count associated with that code page to indicate that at least one thread has ceased executing in that code page; and
   program code for, responsive to a modified use count indicating that no threads are currently executing in the associated code page, setting that code page to be non-executable.

32. The computer program product of claim 23 further comprising:
   program code for determining that at least one thread of the program has terminated; and
   program code for, responsive to determining that the at least one thread has terminated, updating the control flow graph concerning the program to account for the termination of the at least one thread.

* * * * *